United States Patent [19]
Gupta et al.

[11] Patent Number: 5,715,167
[45] Date of Patent: Feb. 3, 1998

[54] FIXTURE FOR CALIBRATED POSITIONING OF AN OBJECT

[75] Inventors: Rajiv Gupta, Schenectady, N.Y.; Barry Joe Webb, Hanson, Ky.

[73] Assignee: General Electric Company, Schenectady, N.Y.

[21] Appl. No.: 502,034

[22] Filed: Jul. 13, 1995

[51] Int. Cl.⁶ .............. G06F 19/00; G06G 7/64; G06G 7/66

[52] U.S. Cl. .............. 364/474.28; 364/474.24; 364/474.26; 364/474.34; 364/474.36

[58] Field of Search .............. 364/474.28, 474.32, 364/474.34, 474.35, 470.06, 474.24, 474.25, 474.26, 474.37; 324/758, 72.5, 135; 356/400

[56] References Cited

U.S. PATENT DOCUMENTS

| | | | |
|---|---|---|---|
| 4,737,918 | 4/1988 | Langlois et al. | 364/474.28 |
| 5,321,351 | 6/1994 | Swart et al. | 324/158 F |
| 5,408,189 | 4/1995 | Swart et al. | 324/758 |
| 5,528,505 | 6/1996 | Granger et al. | 364/474.28 |

OTHER PUBLICATIONS

"2.5 D X-Ray Metrology" By R. Gupta, J.A. Noble, R.I. Hartley, A.M. Schmitz to be Published at the International Conference on Image Processing, to be Held Oct. 22–25, 1995 in Washington, D.C.

"Linear Pushbroom Cameras" By R.I. Hartley, R. Gupta, Presented at the Third European Conference on Computer Vision, Stockholm, Sweden, Computer Vision—ECCV '94, pp. 555–566.

"X-Ray Metrology For Quality Assurance" By J.A. Noble, R.I. Hartley, J.L. Mundy, J. Farley Presented at the 1994 International Conference on Robotics and Automation, Proc. IEEE International Conference on Robotics and Automation, pp. 1113–1119, San Diego, CA. May 8–13, 1995.

"CAD–Based Inspection Using X–Ray Stereo" By J.A. Noble, R. Gupta, J.L. Mundy, R.I. Hartley, W. Hoffman Presentation to ICRA '95 Nagota, Japan, May 21–27, 1995.

*Primary Examiner*—Reba I. Elmore
*Assistant Examiner*—Ramesh Patel
*Attorney, Agent, or Firm*—Lawrence P. Zale; Marvin Syder

[57] ABSTRACT

A system of accurately positioning a manufactured part in a calibrated position, involves positioning the part on a structure. Adjusting the part on the structure such that points on the surface of the part known to be accurate and drilling notches in the part at known locations. Distances from the surface of the part to the structure in 'x' and 'z' directions, and a rotation angle $\theta$ are measured. The part is then placed in a fixture having a nest plate with pins which hold the part by the notches thereby defining an axis through the part. A 'z' stop is adjusted to the measured 'z' distance which stops rotation of the part about the axis between the pins. An 'x' stop is set to the measured x distance which stops translation of the part along the axis between the pins. The nest plate is pivotally attached to the base plate allowing the nest plate to rotate with respect to the base plate the rotational angle $\theta$. This results in calibrated positioning of the part allowing maximum access to the part. Additionally, the fixture is made of X-ray transparent material, and radio-opaque tooling balls are positioned at known locations to facilitate X-ray imaging of the part for testing.

4 Claims, 2 Drawing Sheets

FIXTURE FOR CALIBRATED POSITIONING OF AN OBJECT

CROSS REFERENCE TO RELATED APPLICATIONS

This application is related to U.S. Pat. Nos. 5,550,376 "Method Of Calibration Of Imaging Devices" by R. Gupta, J. Noble, Hartley, Schmitz; and 5,559,334 "Epipolar Reconstruction Of 3D Structures" by R. Gupta, R. Hartley both incorporated by reference and both assigned to the present assignee.

BACKGROUND OF THE INVENTION

1. Field of the Invention

This invention pertains to a device for holding parts in precise calibrated positions, for manufacturing, or non-destructive testing.

2. Description of Related Art

In the manufacturing of parts, an engineer creates a design or blueprint of locations and shapes of structures of the part identified in part coordinate system. These may be designed on a CAD/CAM workstation. Machines manufacture the part according to the design, or CAD model, but errors in position of the part causes error and differences between the manufactured part and the theoretical design (CAD model).

In order to insure proper quality, the manufactured parts are examined, typically by non-destructive testing to insure accurate construction. Those which fail are either re-manufactured or discarded. Again precise positioning of the part is essential.

Typically, a part is examined by measuring distances between preselected points on the surface of the part and a reference structure. These distances are compared to preset tolerance distances to determine if the part is to be rejected. The remainder of the part may then be examined by non-destructive testing.

A typical type of non-destructive testing involves imaging of the part such that internal structures are visible. One such type of imaging is X-ray imaging, employing an X-ray imaging device which creates 2D projection images of the 3-D part.

The X-ray projection images are used to form a three-dimensional model of the part is constructed from the projections which is then compared to the CAD model. The part is rotated and imaged in the field of view of an imaging device, at successive angular positions covering a full range of 360 degrees. These images can be then assembled into a complete volumetric 3D model of the part using techniques borrowed from computed tomography (CT).

In order to compare the X-ray images to the CAD model, calibrated locations of the fixture and visible features on the part are essential.

Currently there is a need for a device which accurately positions a part in a known position relative to a reference frame.

SUMMARY OF THE INVENTION

A system for calibrate positioning of a part manufactured according to a CAD model or blueprint employs a fixture for accurately positioning the part, while allowing a maximum of access to the part.

Several nest points are used to hold the part and define a part coordinate system. Distances from along several axes to the surface of the part are measured at a predetermined 'z' stop point, and an 'x' stop point, $z_s$, and $x_s$, respectively. Notches are drilled into the part in opposite surfaces of the part defining an axis through the notches and the part. An angle of orientation is measured about an axis perpendicular to that through the notches.

The part is placed in a fixture having a pair of pins fitting into the notches allowing rotation amount the pins. An adjustable 'z' stop nub, which is adjusted to the measured distance $z_s$, stops rotation of the part about the axis through the notches. An adjustable 'x' stop nub is adjusted to stop translation along the axis through the notches at the measured distance $x_s$. The pins, and stops are mounted on a nest plate which is pivotally mounted on a base plate. The nest plate is adjusted to rotate about the 'z' axis the measured angle θ. This results in the part being positioned in space in a calibrated position in space relative to a fixed reference frame while still allowing a maximum of access to the part.

Additionally, for X-ray imaging, the fixture is constructed of X-ray transparent materials and a number of radio-opaque "tooling balls" are placed at fixed locations with respect to the part. These then appear on the images and are used as reference markers to reconstruct a computer model of the part. The computer model may then be compared to the original CAD model.

OBJECT OF THE INVENTION

An object of the present invention is to provide a method and device for accurately holding a part in a calibrated position relative to a reference frame.

Another object of the present invention is to provide a method and device for accurately holding a part in a calibrated position relative to a reference frame during non-destructive testing of the part.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
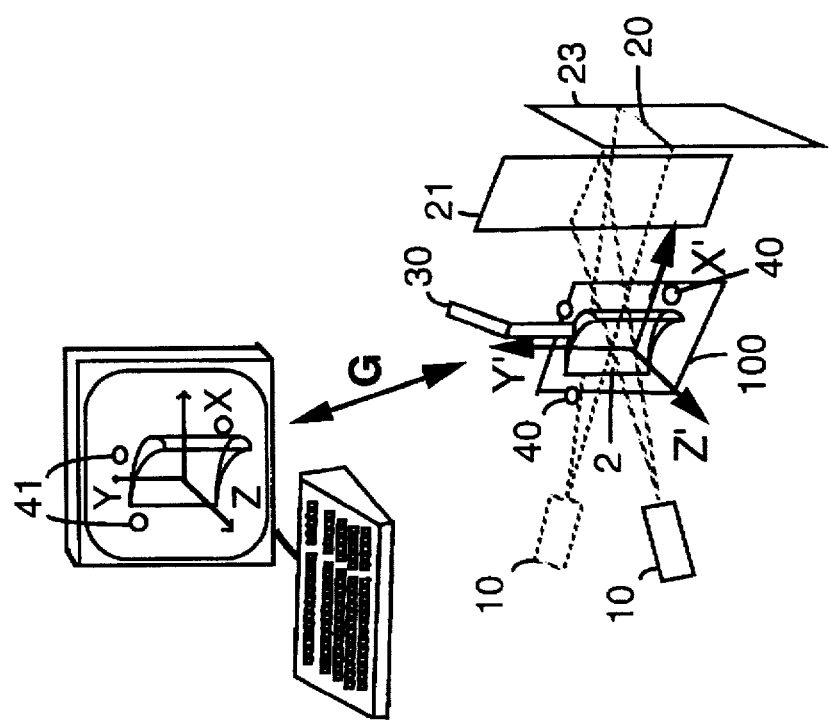
FIG. 1 a partial block diagram in perspective view of a manufactured part being imaged for non-destructive testing of the part.

In FIG. 1, a fixture 100 holds object 2 in a calibrated position for a number of uses, such as for non-destructive imaging and testing as described in the co-pending applications referenced above in the "CROSS REFERENCE TO RELATED APPLICATIONS", but may also be used in other types of milling, grinding or lathing operations. These may also employ interactive imaging to guide tools in performing their operations. Non-destructive X-ray imaging is described for the remainder of the specification, but it is understood that fixture 100 may be employed for the other uses mention above.

An object 2, such as a manufactured part, desired to be inspected, is held by a fixture 100 in a calibrated position relative to fixed reference frame. An imaging device 10, capable of imaging internal structures of object 2, which may be a point X-ray source or other point radiation source, passes X-ray through object 2 to a detector 20, shown here as a linear array of detector elements.

An actuating device 30, such as a mechanical robot arm, moves object 2 along an axis Y' perpendicular to a fan beam from imaging device 10. A 2-D image of object 2, consisting of several 1-D projections, is collected. These ortho-perspective images of object 2 are used for non-destructive testing.

Besides moving object 2, actuating device 30 can also rotate it through any desired angle with line of motion 13 as the axis of rotation. This allows imaging of object 2 in different orientations, as shown as two different projection images 21, 23.

Object 2 is machined or molded according to a CAD model as a plan. Since all geometric information about object 2 is specified according to a CAD coordinate system, it is useful to define a relationship between the coordinates of object 2 defined in imager coordinate system and CAD coordinates.

This may be described by an angular rotation between two coordinate systems; and a translation from the origin of the CAD coordinate system to the origin of the imager coordinate system. This matrix, which is a standard (3×4) solid body rotation/translation coordinate transformation matrix, will be known as global matrix G. G does not change from image to image but merely defines a 3-D axis rotation and translation between the CAD and imager coordinate systems.

When parts are manufactured, it is common to define points on the surface of the part, 'nest points', which are measured relative to each other, or to a fixed reference frame, such as a reference frame fixed with respect to the manufacturing machine, to determine if the part is within manufacturing tolerances. In order to determine it is manufactured correctly, predefined points are measures and the distances between them also measured.

This may be performed by placing part 2 into a cradle constructed to hold the part. If the part touches the cradle at the defined nest points, or is within a small acceptable distance of the cradle at these points, the part is accepted.

However, the problem arises that other locations of the part may be incorrectly manufactured, while these nest points are correct. Or structures, such as holes, may be incorrectly drilled while the nest points are correct. This results in defective parts being used. In order to correct this problem, non-destructive testing is employed. The CAD model, or blueprints, may be directly compared to images taken of the part, or computer models of structures of the part, constructed from the images.

This requires a high degree of calibration to determine correct positioning when comparing the model of the part to the CAD model. Also, these should be a great deal of access to the part after it is positioned for milling, lathing or other processes. And lastly, there is a need for reference markers on the images to calibrate the position of the part with that of the CAD model.

Figure 2:
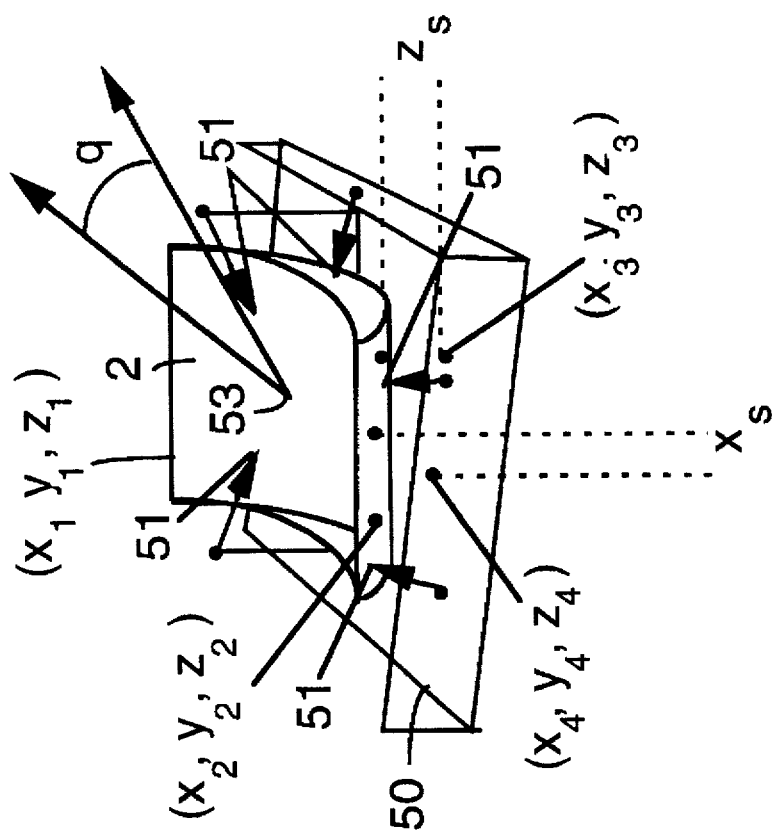
FIG. 2 is a plan view of a structure, compatible with the present invention, for accurately determining locations in a part coordinate system using nest points as reference points.

In FIG. 2, a cradle 50 and part 2 are shown. Calibrated positioning of the present invention is performed by first determining the proper location to drill a pair of notches in opposite surfaces of the part. Part 2 is placed into cradle 50 to holding part 2 at nest points 51 to determine a part coordinate system origin 53. Two notches are drilled in part 2 in opposite surfaces at locations $(x_1,y_1,z_1)$, $(x_2,y_2,z_2)$. These locations are measured from the part coordinate system origin 53.

Next, a 'z' stop distance, "$z_s$" to the surface of part 2 at a predetermined location $(x_3,y_3,z_3)$ where a 'z' stop will be located is measured.

Similarly, an 'x' stop distance, "$x_s$" to the surface of part 2 at a predetermined location $(x_4,y_4,z_4)$ where an 'x' stop will be located is measured.

Then a rotation angle θ of the part about the 'z' axis is determined. Knowing locations $(x_1,y_1,z_1)$, $(x_2,y_2,z_2)$, $(x_3,y_3,z_3)$, $(x_4,y_4,z_4)$, distances $z_s$, $x_s$, and angle θ, part 2 may be placed in the same position in another mechanism.

Figure 3:
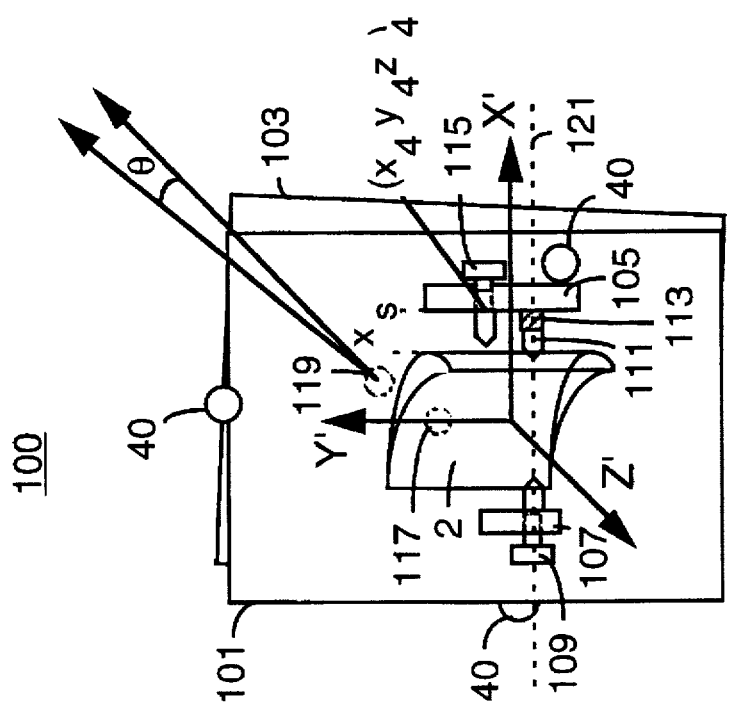
FIG. 3 is a plan view of a fixture of FIG. 1, compatible with the present invention, for accurately holding a part relative to a fixed coordinate system.

In FIG. 3, part 2 is then placed in fixture 100. Fixture 100 has a nest plate 101 attached to the base plate 103 by a pivot 119, shown in phantom, allowing the nest plate 101 to be rotated an angle θ about the 'z' axis with respect to the base plate 103. Nest plate 101 defines an 'x'-'y' plane in the part coordinate system.

A first and second pedestal, 105, 107, respectively, extend out of the 'x'-'y' plane of nest plate 101 in a 'z' direction.

A sprung pin 111 passes through first pedestal 105 oriented in a 'y' direction.

A spring means 113, which may be a coiled spring, a compressible material, or torsion spring, fits between sprung pin 111 and first pedestal 105, causing sprung pin 111 to be pressed into the notch of part 2.

An adjustable pin 109, which may be a threaded pointed screw, or shaft which may be accurately fixed at a measured position, passes through second pedestal 107, and into the other notch of part 2. An axis 121 is defined through part 2 and the notches.

An adjustable 'z' stop nub 117, which may be the same as adjustable pin 109, is located at $(x_3,y_3,z_3)$, and is shown in phantom $z_3$ is the z extent of adjustable pin 109 in an arbitrarily selected fixed position, such as totally retracted, provided that the same $z_3$ is used in measuring $z_s$ in structure 50. Adjustable 'z' stop nub 117 protrudes from nest plate 101, and adjusts up or down in the 'z' direction. 'z' stop nub is adjusted to cause the surface of object 2 to be a distance $z_s$ from $z_3$ in the 'z' direction. 'z' stop nub 117 stops rotation of part 2 about axis 121 passing through the notches.

An 'x' stop nub 115, similar to 'z' stop nub 117, is located at $(x_4,y_4,z_4)$, and protrudes in an 'x' direction through first pedestal 105, is adjusted to stop translation of part 2 along axis 121 at the measured distance $x_s$. $x_4$ is the x extent of 'x' stop nub 115 in an arbitrarily selected fixed position, such as totally retracted, provided that the same $x_4$ is used in measuring $x_s$ in structure 50.

Positioning part 2 within fixture 100 as explained above causes part 2 to be in the same calibrated position in space relative to a fixed reference frame as the CAD model, still allowing a maximum of access to part 2 for machining or molding operations.

To employ fixture 100 in X-ray imaging, substantially all parts of fixture 100 are constructed of a material substantially transparent to X-rays. This may be any number of plastics, fiberglass, or composite materials. A plurality of physical markers 40, which may be "tooling balls", are selected of a material which show up opaque on the projection images. These are fixed to fixture 100 at very accurate positions relative to the part coordinate system origin, appear on X-ray images, and may be used as known reference points to calibrate the position of the part.

For a more detailed description of reconstruction, calibration, and experimental results, please refer to "2.5 D X-Ray Metrology" by Rajiv Gupta, J. Alison Noble, Richard Hartley, Joe Mundy, Andrea Schmitz to be published at the International Conference on Image Processing, to be held Oct. 22–25, 1995 in Washington, D.C.; and "X-ray Metrology for Quality Assurance" by J. Alison Noble, Richard Hartley, Joe Mundy, J. Farley presented at the 1994 International Conference on Robotics and Automation. Proc. *IEEE International Conference on Robotics and Automation* pp. 1113–1119, San Diego, Calif. May 8–13; both hereby incorporated by reference.

An overall discussion of these topics is described in "CAD-based Inspection Using X-Ray Stereo" by J. Alison Noble, Rajiv Gupta, Joe Mundy, Richard Hartley, W. Hoffman presentation to 1995 International Conference on Robotics and Automation (ICRA '95) Nagota, Japan May 21–27, 1995" also hereby incorporate by reference.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of holding a part in a calibrated position comprising the steps of:

a) holding the part at points previously verified as correct to define a part coordinate system having orthogonal X, Y, Z axes and its origin;

b) drilling a pair of notches in opposite sides of said part at a predetermined $(x_1,y_1,z_1)$, $(x_2,y_2,z_2)$ coordinates relative to the part origin;

c) measuring a distance $z_s$ in the 'z' direction from the surface of said part to a predetermined 'z' stop coordinate $(x_3,y_3,z_3)$;

d) measuring a distance $x_s$ in the 'x' direction from the surface of said part to an 'x' stop coordinate $(x_2,y_2,z_2)$;

e) placing the part in a fixture such that an adjustable pin is in line with a sprung pin which fit into the notches defining an axis, the fixture having an 'x' stop nub for stopping translation of the part along the axis between the pins, and a 'z' stop nub rotation of the part about the axis between the pins;

f) adjusting an 'x' stop nub to the measured distance $x_s$;

g) adjusting a 'z' stop nub to the measured distance $z_s$;

h) rotating the part about the axis defined by the notches until the surface of the part comes in contact with the 'z' stop nub; and i) translating the part along the 'x' axis until the surface of the part comes in contact with the 'x' stop nub.

2. A method of analyzing a part in a calibrated position comprising the steps of:

a) holding the part at points previously verified as correct to define a part coordinate system having orthogonal X, Y, Z axes and its origin;

b) drilling a pair of notches in opposite sides of said part at a predetermined $(x_1,y_1,z_1)$, $(x_2,y_2,z_2)$ coordinates relative to the part origin;

c) measuring a distance $z_s$ in the 'z' direction from the surface of said part to a predetermined 'z' stop coordinate $(x_3,y_3,z_3)$;

d) measuring a distance $x_s$ in the 'x' direction from the surface of said part to an 'x' stop coordinate $(x_2,y_2,z_2)$;

e) placing the part in a fixture such that an adjustable pin is in line with a sprung pin which fit into the notches defining an axis, the fixture having an 'x' stop nub for stopping translation of the part along the axis between the pins, a 'z' stop nub rotation of the part about the axis between the pins, and a plurality of tooling balls of known size and location relative to the fixture;

f) adjusting an 'x' stop nub to the measured distance $x_s$;

g) adjusting a 'z' stop nub to the measured distance $z_s$;

h) rotating the part about the 'x' axis until the surface of the part comes in contact with the 'z' stop nub; and i) translating the part along the 'x' axis until the surface of the part comes in contact with the 'x' stop nub;

j) acquiring X-ray images of the part and tooling balls; and k) determining the size and location of structures of the part from the sizes and locations of the parts in the image, the tooling balls in the images, and the tooling balls.

3. A fixture for holding a part for analysis, the part having a pair of notches drilled in opposite surfaces at a known coordinates relative to a part coordinate system comprising:

a) a base plate;

b) a nest plate pivotally attached to the base plate allowing the nest plate to be rotated an angle θ about a 'z' axis with respect to the base plate, the nest plate defining an 'x'-'y' plane in said part coordinate system, the base plate having a first and second pedestal extending out of the plane of the base plate in a 'z' direction;

c) a sprung pin passing through the first pedestal, oriented in a 'y' direction for fitting into one of said notches of the part;

d) a spring means for fitting between the sprung pin and the first pedestal for causing the sprung pin to be pressed into the notch of the part;

e) an adjustable pin passing through the second pedestal, the adjustable pin being capable of being fixed at various positions along the axis between the notches, causing the part to mode in a direction along the notches;

f) a 'z' stop nub protruding from the base plate an adjustable distance stopping rotation of the part about the axis through the notches at the adjustable distance; and g) a 'x' stop nub protruding from on the first pedestal an adjustable distance stopping translation of the part along the axis through the notches at the adjustable distance.

4. The fixture for holding a part for analysis of claim 3, wherein substantially all materials used to construct the fixture are transparent to X-ray radiation and further comprising a plurality of radio-opaque tooling balls located at predetermined locations relative to the fixture.

* * * * *